United States Patent
Hart et al.

(10) Patent No.: US 8,797,881 B2
(45) Date of Patent: Aug. 5, 2014

(54) COEXISTENCE MECHANISM FOR MULTIPLE CHANNELS

(75) Inventors: Brian Donald Hart, Sunnyvale, CA (US); Raghuram Rangarajan, San Jose, CA (US); Ahmadreza Hedayat, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 336 days.

(21) Appl. No.: 13/158,945

(22) Filed: Jun. 13, 2011

(65) Prior Publication Data
US 2012/0314583 A1 Dec. 13, 2012

(51) Int. Cl.
| | |
|---|---|
| *H04L 12/26* | (2006.01) |
| *H04B 7/00* | (2006.01) |
| *H04L 27/28* | (2006.01) |
| *H04W 72/04* | (2009.01) |
| *H04W 36/18* | (2009.01) |
| *H04L 1/00* | (2006.01) |

(52) U.S. Cl.
CPC .............. *H04W 72/04* (2013.01); *H04L 43/00* (2013.01); *H04L 1/00* (2013.01); *H04W 36/18* (2013.01)
USPC ........... 370/241; 370/310; 370/331; 370/334; 370/343; 370/338; 370/203; 370/208; 370/329; 370/431; 370/464; 375/224; 375/260

(58) Field of Classification Search
CPC ...... H04W 36/18; H04W 72/04; H04L 43/00; H04L 1/20
USPC ............................ 370/203–464; 375/224–260
See application file for complete search history.

(56) References Cited

U.S. PATENT DOCUMENTS

| | | | | |
|---|---|---|---|---|
| 6,804,528 | B1 * | 10/2004 | Laroia et al. .................. | 455/503 |
| 7,124,041 | B1 * | 10/2006 | Johnson et al. ................. | 702/58 |
| 7,221,681 | B2 * | 5/2007 | Choi et al. ..................... | 370/447 |
| 7,804,915 | B2 * | 9/2010 | Huang et al. .................. | 375/296 |
| 7,929,416 | B2 * | 4/2011 | Papasakellariou et al. ... | 370/208 |
| 7,933,350 | B2 * | 4/2011 | Liu et al. ....................... | 375/260 |
| 7,961,674 | B2 * | 6/2011 | Jing et al. ...................... | 370/328 |

(Continued)

FOREIGN PATENT DOCUMENTS

| | | |
|---|---|---|
| EP | 1 768 441 A2 | 3/2007 |
| WO | WO 2005/034435 A2 | 4/2005 |
| WO | WO 2011/053775 A1 | 5/2011 |

OTHER PUBLICATIONS

International Search Report and the Written Opinion of the International Search Authority for PCT/US12/41993 dated Aug. 23, 2012.

(Continued)

*Primary Examiner* — Ayaz Sheikh
*Assistant Examiner* — Venkatesh Haliyur
(74) *Attorney, Agent, or Firm* — Tucker Ellis LLP (57) ABSTRACT

In accordance with an example embodiment, there is disclosed herein a coexistence mechanism for multiple channels. A plurality of channels are monitored to determine which channels are available for communications. Upon receiving a request to establish communications on a channel set within the plurality of channels, a response is sent to the request on at least one in the channel set. The response comprises data representative of which channels from the channel set are available for communications. Optionally, the response may include data indicating how long the unavailable channels will be occupied.

18 Claims, 7 Drawing Sheets

(56) References Cited

U.S. PATENT DOCUMENTS

| | | | |
|---|---|---|---|
| 8,099,096 B2* | 1/2012 | Prakash et al. | 455/437 |
| 8,169,889 B2* | 5/2012 | Walton et al. | 370/208 |
| 8,195,166 B1* | 6/2012 | Oprescu-Surcobe et al. | 455/436 |
| 8,270,352 B2* | 9/2012 | Sankar et al. | 370/329 |
| 8,295,779 B2* | 10/2012 | Cave et al. | 455/69 |
| 8,379,738 B2* | 2/2013 | Pi et al. | 375/260 |
| 8,379,755 B2* | 2/2013 | Cleveland | 375/295 |
| 8,395,997 B2* | 3/2013 | Banerjea et al. | 370/241 |
| 8,625,562 B2* | 1/2014 | Noh et al. | 370/338 |
| 2003/0091066 A1* | 5/2003 | Choi et al. | 370/468 |
| 2008/0130580 A1* | 6/2008 | Chaponniere et al. | 370/331 |
| 2008/0225965 A1* | 9/2008 | Pi et al. | 375/260 |
| 2009/0110087 A1* | 4/2009 | Liu et al. | 375/260 |
| 2009/0257406 A1* | 10/2009 | Sankar et al. | 370/336 |
| 2010/0008318 A1* | 1/2010 | Wentink et al. | 370/329 |
| 2010/0075704 A1* | 3/2010 | McHenry et al. | 455/509 |
| 2010/0091892 A1* | 4/2010 | Gorokhov | 375/260 |
| 2010/0091893 A1* | 4/2010 | Gorokhov | 375/260 |
| 2010/0113004 A1* | 5/2010 | Cave et al. | 455/422.1 |
| 2010/0124297 A1* | 5/2010 | Papasakellariou et al. | 375/260 |
| 2010/0150114 A1* | 6/2010 | Che | 370/336 |
| 2010/0179865 A1* | 7/2010 | Lundqvist et al. | 705/14.4 |
| 2010/0254473 A1* | 10/2010 | Wu et al. | 375/267 |
| 2011/0002410 A1* | 1/2011 | Forenza et al. | 375/267 |
| 2011/0116401 A1* | 5/2011 | Banerjea et al. | 370/252 |
| 2011/0116489 A1* | 5/2011 | Grandhi | 370/338 |
| 2011/0194475 A1* | 8/2011 | Kim et al. | 370/311 |
| 2011/0228666 A1* | 9/2011 | Barbieri et al. | 370/216 |
| 2011/0292895 A1* | 12/2011 | Wager et al. | 370/329 |
| 2012/0044925 A1* | 2/2012 | Lee et al. | 370/338 |
| 2012/0051312 A1* | 3/2012 | Noh et al. | 370/329 |
| 2012/0063383 A1* | 3/2012 | Barbieri et al. | 370/315 |
| 2012/0182886 A1* | 7/2012 | Ong et al. | 370/252 |
| 2012/0207036 A1* | 8/2012 | Ong et al. | 370/252 |
| 2012/0213204 A1* | 8/2012 | Noh et al. | 370/331 |
| 2012/0307757 A1* | 12/2012 | Edler Von Elbwart et al. | 370/329 |
| 2012/0314583 A1* | 12/2012 | Hart et al. | 370/241 |
| 2012/0314673 A1* | 12/2012 | Noh et al. | 370/329 |
| 2013/0034071 A1* | 2/2013 | Lee et al. | 370/329 |
| 2013/0145239 A1* | 6/2013 | Pi et al. | 714/807 |
| 2013/0201835 A1* | 8/2013 | Banerjea et al. | 370/241 |

OTHER PUBLICATIONS

Cisco—Brian Hart; Raghuram Rangarajan; Reza Hedayat; Andrew Myles; "Improved CCA for 80 and 160 MHz BSSs" doc.: IEEE 802.11-10/0744r1; Jul. 12, 2010.

* cited by examiner

COEXISTENCE MECHANISM FOR MULTIPLE CHANNELS

TECHNICAL FIELD

The present disclosure relates generally to multi-channel communications.

BACKGROUND

WiFi is increasing in popularity and is often used for mission critical networks. Access points belonging to adjacent networks can interfere with mission critical wireless local area networks ("WLANs"). Mission critical WLANs may experience interference from overlapping basic service sets ("OBSSs") at any time on any channel.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus operable for communicating on a plurality of channels. A controller is operable to receive a signal on at least one of the plurality of channels, the signal comprising data representative of a request to establish communications on a set of channels selected from the plurality of channels. The controller determines from monitoring the plurality of channels which channels from the set of channels are available for establishing communications. If at least one of the channels is available or a special channel is available (such as a primary channel), the controller sends a response to the request to establish communications on at least one of the channels available for establishing communications, wherein the response comprises data representative of which channels from the set of channels are available for establishing communications.

In accordance with an example embodiment, there is disclosed herein a method, comprising monitoring a plurality of channels to determine which channels are unavailable for establishing communication. A signal is received, the signal comprising data representative of a request to establish communications on a set of the plurality of channels. A processor determines which channel(s) are available from the set of channels from monitoring the plurality of channels. If at least one of the channels is available or a special channel is available (such as a primary channel), a response to the request to establish communications on the set of the plurality of channels is sent. The response comprising data representative of which channels are available from the set of channels.

In accordance with an example embodiment, there is disclosed herein logic encoded in at least one non-transitory computer readable storage medium for execution by a processor, and when executed by a processor operable to receive data indicating which channels selected from a plurality of channels are available for establishing communications. The logic is further operable to receive a request to establish communications on a set of channels of the plurality of channels. The logic is operable to determine which channels of the set of channels are available channels for communications. The logic is further operable so that if at least one of the channels is available or a special channel is available (such as a primary channel), it sends a response to the request to establish communications on at least one of the available channels, the response comprising data representative of at least one available channel of the set of channels.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Figure 1:
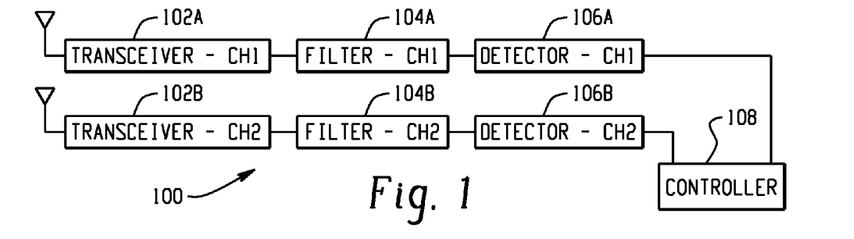
FIG. 1 is a simplified block diagram illustrating an example of an apparatus with two transceivers each feeding two single channel transceivers in accordance with an example embodiment.

FIG. 1 is a simplified block diagram illustrating an example of an apparatus 100 with two single channel transceivers 102A, 102B in accordance with an example embodiment. Transceiver 102A is operable to communicate on a first media ("channel 1" or "first channel"), and transceiver 102B is operable to communicate on a second media ("channel 2" or "second channel"). The first and second media may be any suitable media for providing communications. They may be contiguous in frequency or non-contiguous, with the same or different channel widths. In particular embodiments, the first and second media are completely different media (e.g. different antennas, or a mixture of wireless, category ("Cat") 5/6/7, coaxial cable, phone lines, and power lines etc.). In an example embodiment, filters 104A, 104B are coupled with transceivers 102A, 102B respectively. Signals received by transceivers 102A, 102B are provided to detectors 106A, 106B respectively. Signals from detectors 106A, 106B are provided to controller 108. Controller 108 suitably comprises logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, controller 108 is operable to receive a signal on at least one of the channels 1 and 2 that comprises data representative of a request to establish communications on a set of channels selected from the plurality of channels, channels 1 and 2 in this example; however, as one skilled in the art can readily appreciate any physically realizable number of channels may be coupled with controller 108. Controller 108 determines from monitoring channels 1 and 2 which channels are available for establishing communications. Controller 108 sends a response to the request to establish communications on at least one of the channels available for establishing communications, for example if the request was received on channel 1 a response may be sent on channel 1. In particular embodiments, the response is sent on a plurality of available channels, for example if both channels 1 and 2 are available the response is sent on channels 1 and 2. The response comprises data representative of which channels from the set of channels are available for establishing communications, or alternatively data representative of which channels are unavailable.

In an example embodiment, controller 108 determines which channels from the set of channels are available for establishing communications from a clear channel assessment (CCA) of channels 1 and 2. For example, if energy is detected on a channel greater than a predetermined threshold, e.g., the CCA threshold, the channel is considered unavailable.

In particular embodiments, the controller 108 senses a hierarchy of channels. For example, referring to Table 1 below, there are illustrated eight adjacent 20 MHz channels in column A (CH 1 ... CH 8). Column B illustrates an example where two adjacent 20 MHz channels are employed for 40 MHz channels. Column C illustrates an example where four adjacent 20 MHz, or two adjacent 40 MHz channels are employed for 80 MHz channels. Column D illustrates an example where eight 20 MHz, four 40 MHz or two 80 MHz channels are employed for a 160 MHz channel. In an example embodiment, combinations of the aforementioned channels may be employed. For example, one 40 MHz and two 20 MHz channels may be employed for an 80 MHz channels. In yet another example embodiment, non-adjacent channels may be employed. For example, channels 1 and 3 may be employed for a 40 MHz channel.

In an example embodiment, one channel, e.g., a "primary" is employed and communications are initiated via the primary channel. For example, if the requestor desires a 40 MHz channel, channel 1 is the primary channel and channels 1-4 and 6 are available to the requestor, the requestor sends a request to establish communications on channel 1 to the responder. The responder determines which channels are available to the responder. For example, if channels 2-3 are unavailable to the responder, the responder may send a response that channels 1 and 4 or 1 and 6 can be employed for a 40 MHz channel. The response may be sent on channel 1 and in particular embodiments may also be sent on channels 4 and/or 6.

TABLE 1

|  | A | B | C | D |
|---|---|---|---|---|
| CH 1 | 20 MHz | 40 MHz | 80 MHz | 160 MHz |
| CH 2 | 20 MHz | | | |
| CH 3 | 20 MHz | 40 MHz | | |
| CH 4 | 20 MHz | | | |
| CH 5 | 20 MHz | 40 MHz | 80 MHz | |
| CH 6 | 20 MHz | | | |
| CH 7 | 20 MHz | 40 MHz | | |
| CH 8 | 20 MHz | | | |

In an example embodiment, which will be described in more detail in FIG. 3 infra, the plurality of wireless transceivers 102A, 102B, may further comprise a decoder for decoding either a physical layer ("PHY") header or a Media Access Control ("MAC") header. In an example embodiment, controller 108 determines a time period that an unavailable channel selected from the set of channels is unavailable based on a length field decoded in the physical layer header.

In an example embodiment, controller 108 determines the time period that an unavailable channel will be unavailable from data in the in the PLCP header. For example, the header may comprise a length field with data representative of a length of time (for example in microseconds "µs" or may have data representative of a number of units, e.g., octets for the frame and data representative of a data rate, modulation and/or coding scheme to allow the controller 108 to determine a time period that the channel will be occupied.

In an example embodiment, controller 108 obtains channel occupancy data from a ("MAC") layer header. For example, Controller 108 may determine a time period that an unavailable channel selected from the set of channels is unavailable based on a duration field decoded in the media access control layer header. As another example, controller 108 may determine the time period that the channel will be unavailable based on a Network Allocation Vector ("NAV") in the MAC layer header.

In an example embodiment, the response sent by controller 108 to a request to establish communications on a plurality of channels, the response may include data representative of the time period that the unavailable channel is unavailable obtained from a decoded header. The time period may be obtained from either the PHY or MAC header.

In an example embodiment, controller 108 determines an unavailable channel selected form the set of channels is unavailable based on a mid-packet clear channel assessment. Orthogonal Frequency Division Multiplexing signals look like Gaussian noise, yet can be identified by their regular cyclic extensions. A circuit for determining mid-packet clear channel assessment will be described in FIG. 4 infra.

Figure 2:
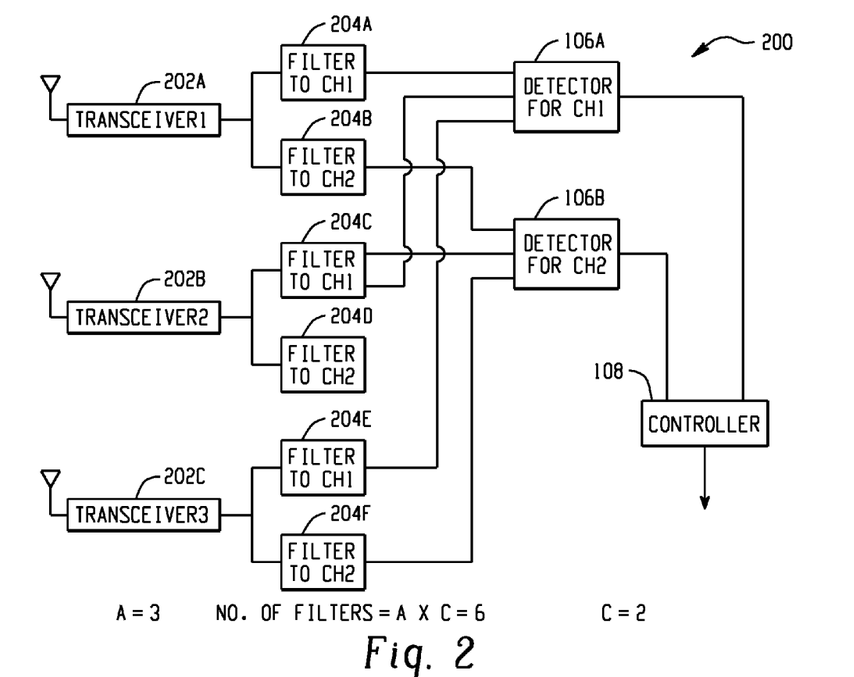
FIG. 2 is a simplified block diagram illustrating an example of an apparatus with three multi-channel transceivers feeding two channel detectors in accordance with an example embodiment.

FIG. 2 is a simplified block diagram illustrating an example of an apparatus 200 with three multi-channel transceivers 202A, 202B, 202C in accordance with an example embodiment. Filter 204A for channel 1 is coupled with transceiver 202A. Filter 204B for channel 2 is coupled with transceiver 202A. Filter 204C for channel 1 is coupled with transceiver 202B. Filter 204D for channel 2 is coupled with transceiver 202B. Filter 204E for channel 1 is coupled with transceiver 202C. Filter 204F for channel 2 is coupled with transceiver 202C. Detector 106A for channel 1 is coupled with filters 204A, 204C, 204E. Detector 106B for channel 2 is coupled with filters 204B, 204B, 204F. Detectors 106A, 106B are coupled with controller 108.

As one skilled in the art should readily appreciate, any physically realizable number of transceivers and channels may be employed. The number of transceivers and channels for the example in FIG. 2 were selected merely for ease of illustration and the example should not be construed as limited to the number of transceivers and/or channels shown and described herein. As one skilled in the art should readily appreciate, the number of filters employed is a product of the number of transceivers and the number of channels being monitored. In the illustrated example, three transceivers are employed for two channels, resulting in 3×2=6 filters.

Controller 108 may employ any suitable means for determining whether a channel is available. For example, as described herein supra, controller 108 may rely on CCA of a channel to determine if the channel is available. As described herein supra, controller 108 may decode the PHY and/or MAC header to determine how long a channel will be occupied.

Figure 3:
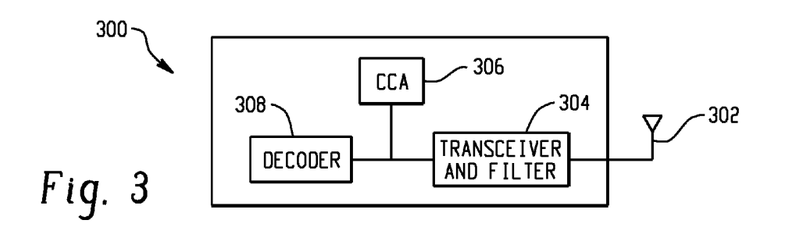
FIG. 3 is a block diagram illustrating an example of an apparatus with a clear channel assessment (CCA) and a decoder for decoding a header of a packet.

FIG. 3 is a block diagram illustrating an example of an apparatus 300 with a clear channel assessment (CCA) 306 and a decoder 308 for decoding a header of a packet. Signals are received via antenna 302 and provided to detector 304 (via transceiver(s), filter(s) not shown for ease of illustration). A clear channel assessment ("CCA") is obtained from detector 304. If the energy detected on a channel is greater than a pre-determined threshold, the channel is considered busy. Optionally, if a waveform resembling an 802.11 preamble (or cyclic extension) is detected, then the channel may be marked as busy. Optionally, decoder 308 may be employed for decoding received signals. Decoder 308 may be operable to decode PHY headers and/or MAC headers to determine a duration that a media will be busy.

Figure 4:
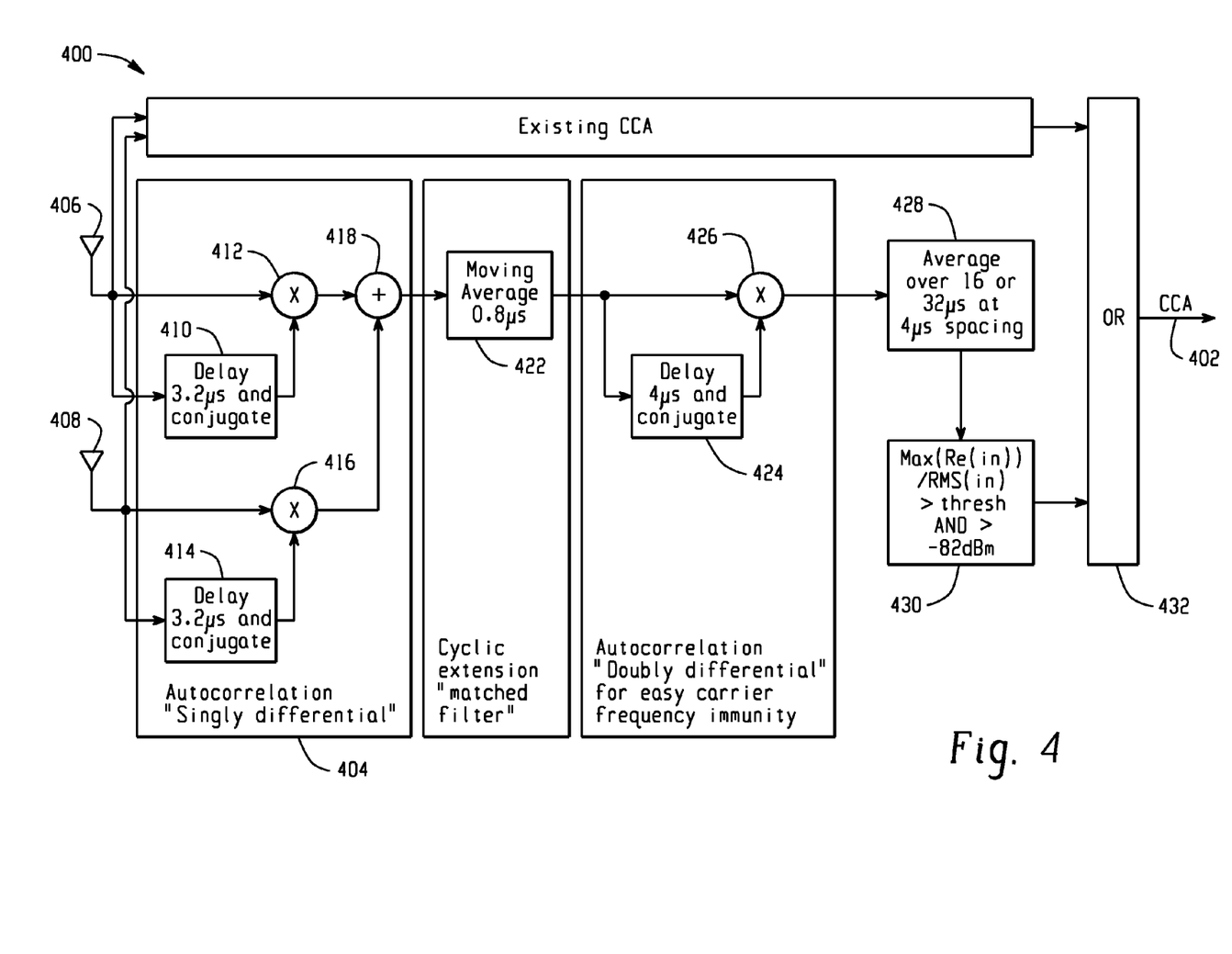
FIG. 4 is a block diagram illustrating an example of a circuit for detecting mid-packet.

FIG. 4 illustrates an example of a circuit 400 that can be employed to detect mid-packet CCA for OFDM signals. In the illustrated example, a CCA circuit 400 is employed to detect energy and/or preamble on a channel. Circuit 400 further comprises a first autocorrelation circuit 404 coupled with antennas 406, 408 (transceiver and filtering omitted for simplicity). Signals received on antenna 406 are delayed a predetermined time period and conjugated by circuit 410. The delayed and conjugated signal from circuit 410 is multiplied by a signal received by antenna 406 by multiplier 412. Signals received on antenna 408 are delayed a predetermined time period and conjugated by circuit 414. The delayed and conjugated signal from circuit 414 is multiplied by a signal received by antenna 408 by multiplier 416.

The multiplied signals from multipliers 412, 416 are combined by summer 418. The output of summer 418 is provided to circuit 422 that determines a moving average of multiplied, summed signals.

The moving average of the multiplied, summed signals from circuit 422 is provided to delay and conjugate circuit 424, which delays and conjugates the average of the multiplied, summed signals. The output of delay and conjugate circuit 424 is provided to multiplier 426 which multiplies the output of delay and conjugate circuit 424 with the output of circuit 422.

The output of multiplier 426 is averaged over a time period by circuit 428. Circuit 430 determines whether the Maximum of Re(in) divided by RMS(in) is above a predetermined threshold, where for $z=x+j*y$; $re(z)=realPartOfZ=x$; RMS (in)... for the sequence in=xn, where n indicates time, RMS $(xn)=sqrt(LPF(|xn|^2))$, where LPF="low pass filter"—e.g., a moving average, or a exponentially decaying average (weighted average), etc. The output of circuit 430 and CCA 402 are provided to OR gate 432. If either circuit 430 or CCA 402 are asserted, the output of OR gate 402 will indicate that the channel is occupied.

Figure 5:
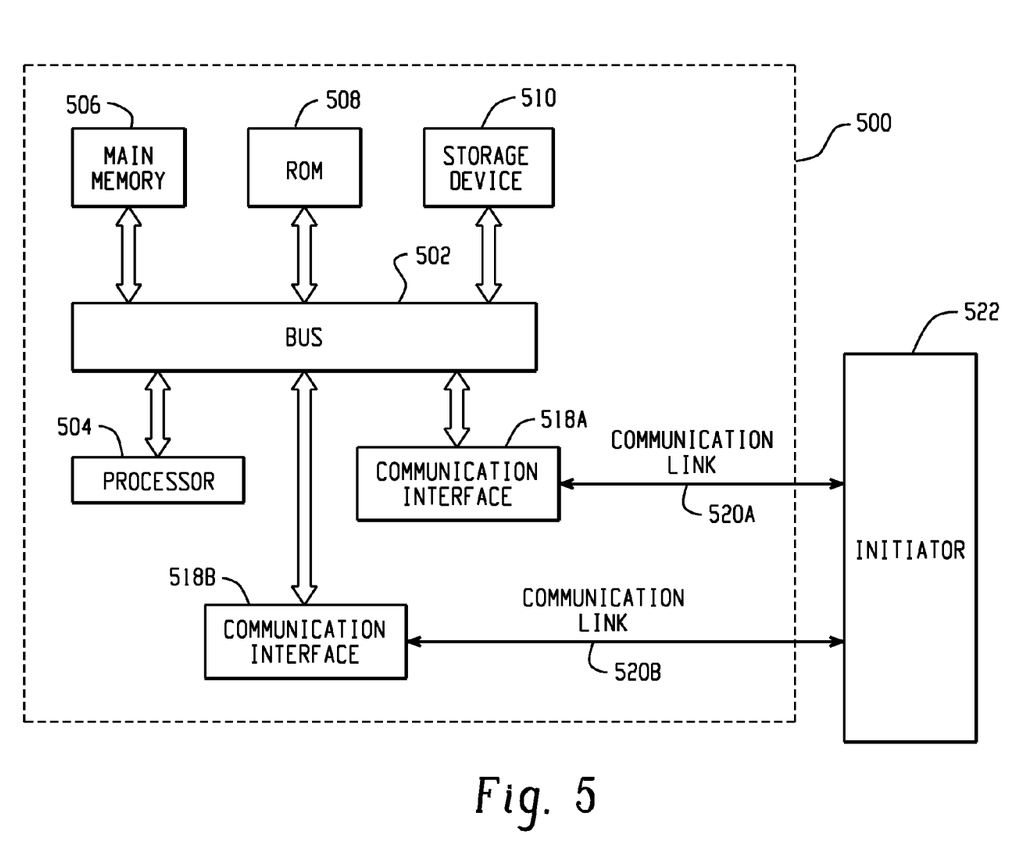
FIG. 5 is a block diagram illustrating an example of a computer system upon which an example embodiment can be implemented.

FIG. 5 is a block diagram that illustrates a computer system 500 upon which an example embodiment may be implemented. Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

An aspect of the example embodiment is related to the use of computer system 500 for providing a coexistence mechanism for multiple channels. According to an example embodiment, the coexistence mechanism for multiple channels is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software. For example processor 504 may execute instructions to implement the functionality of controller 108 in FIGS. 1 and 2.

The term "computer-readable medium" as used herein refers to any medium that participates in providing instructions to processor 504 for execution. Such a medium may take many forms, including but not limited to non-volatile media, and volatile media. Non-volatile media include for example optical or magnetic disks, such as storage device 510. Volatile media include dynamic memory such as main memory 506. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 500 also includes communication interfaces 518A, 518B coupled to bus 502. Communication interfaces 518A, 518B provide a two-way data communication coupling computer system 500 to network links 520A, 520B respectively. Communication links 520A, 520B provide multi-channel communications between computer system 500 and initiator 522. Although the illustrated example has two communication interfaces 518A, 518B coupled with communication links 520A, 520B, those skilled in the art should readily appreciate that any physically realizable number of communication interfaces and links may be employed for communications between computer system 500 and initiator 522.

In an example embodiment, initiator 522 sends a request to establish communications with computer system 500 via at least one of links 520A, 520B. As described in example embodiments herein, computer system 500 can determine whether communications can be established on communication link 520A and/or communication link 520B, and sends a response to initiator 522 indicating which of communication links 520A, 520B are available and/or unavailable.

Figure 6:
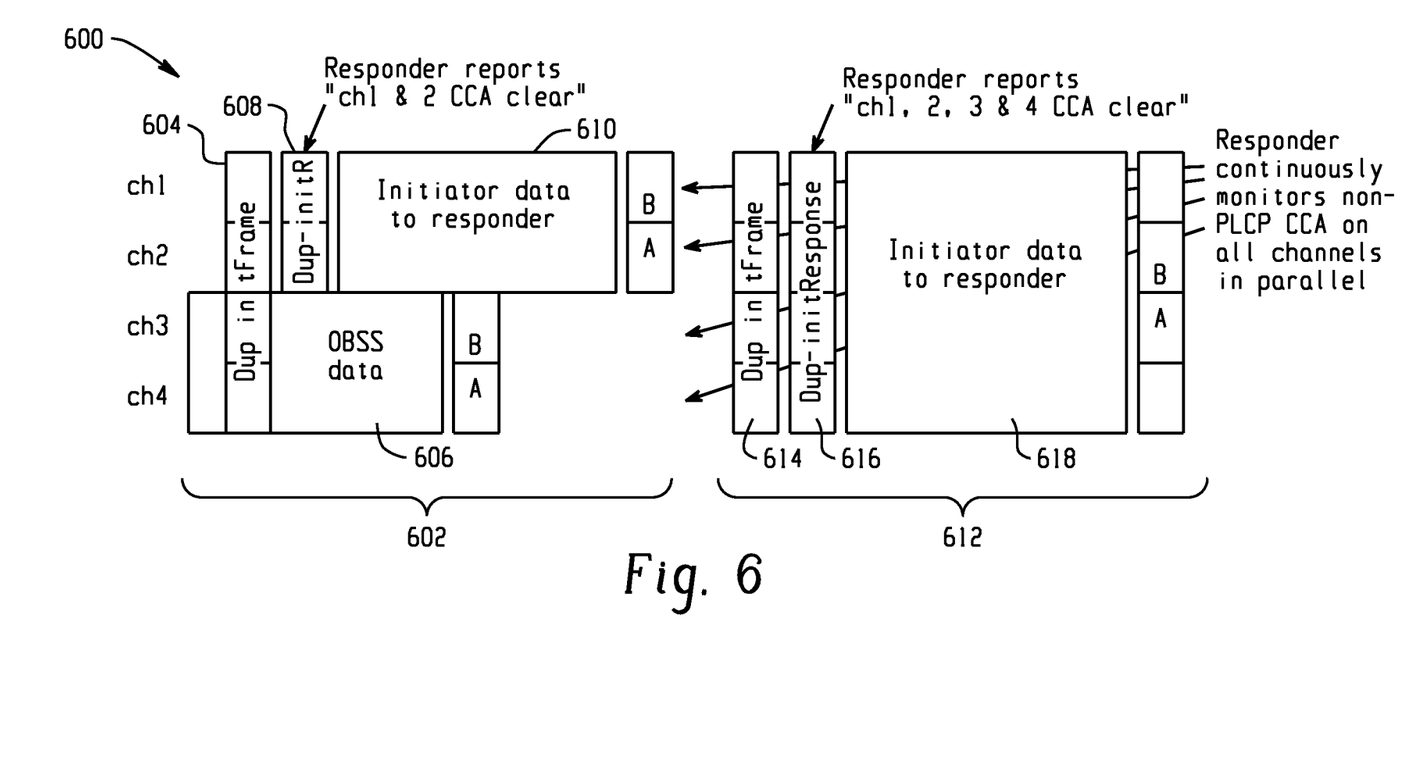
FIG. 6 is an example of a signal diagram for an embodiment that employs clear channel assessment for determining channel availability.

FIG. 6 is an example of a signal diagram 600 for an embodiment that employs clear channel assessment ("CCA") for determining channel availability. In sequence 602, channels 3 and 4 are unavailable due to data being sent by an Overlapping Basic Service Set ("OBSS"). The initiator sends a frame ("InitFrame") 604 to initiate communications. In the illustrated example the frame is sent on channels 1-4 and is requesting to establish communications on channels 1-4. The responder receives a clean copy of InitFrame 604 on channels 1 and 2 and a corrupted copy on channels 3 and 4. The responder may choose to decode duplicated packets only on an agreed channel (i.e., the "primary" channel, here equal to ch1). The responder may or may not be able to correctly receive Initframe 604 on channels 3 and 4 due to interference from OBSS data 606. The responder checks the CCA for channels 1-4 before InitFrame [or in another embodiment, just checks the non-primary channels 2-4, since it won't do anything if it doesn't correctly receives InitFrame correctly on the primary, indicating that ch1 is relatively clear] and determines from energy detected on channels 3 and 4 that channels 3 and 4 are unavailable. The responder sends a response ("InitR") 608 on channels 1 and 2 indicating channels 1 and 2 are clear. In the illustrated example, the response 608 is sent on channels 1 and 2; however, in other embodiments the response 608 may be sent on one of channels 1 or 2 (e.g., always the primary channel). The initiator sends data to the responder as indicated by frame 610.

In sequence 612, channels 1-4 are available for communications. The responder sends frame 614 on channels 1-4. The responder determines from the CCA (or a good decoding of the packet on ch1+CCA indicating ch 2-4 are clear) that channels 1-4 are available. Responder sends a response frame 616 on channels 1-4 indicating that the CCA for channels 1-4 is clear. The initiator sends data 618 to responder on channels 1-4.

Figure 7:
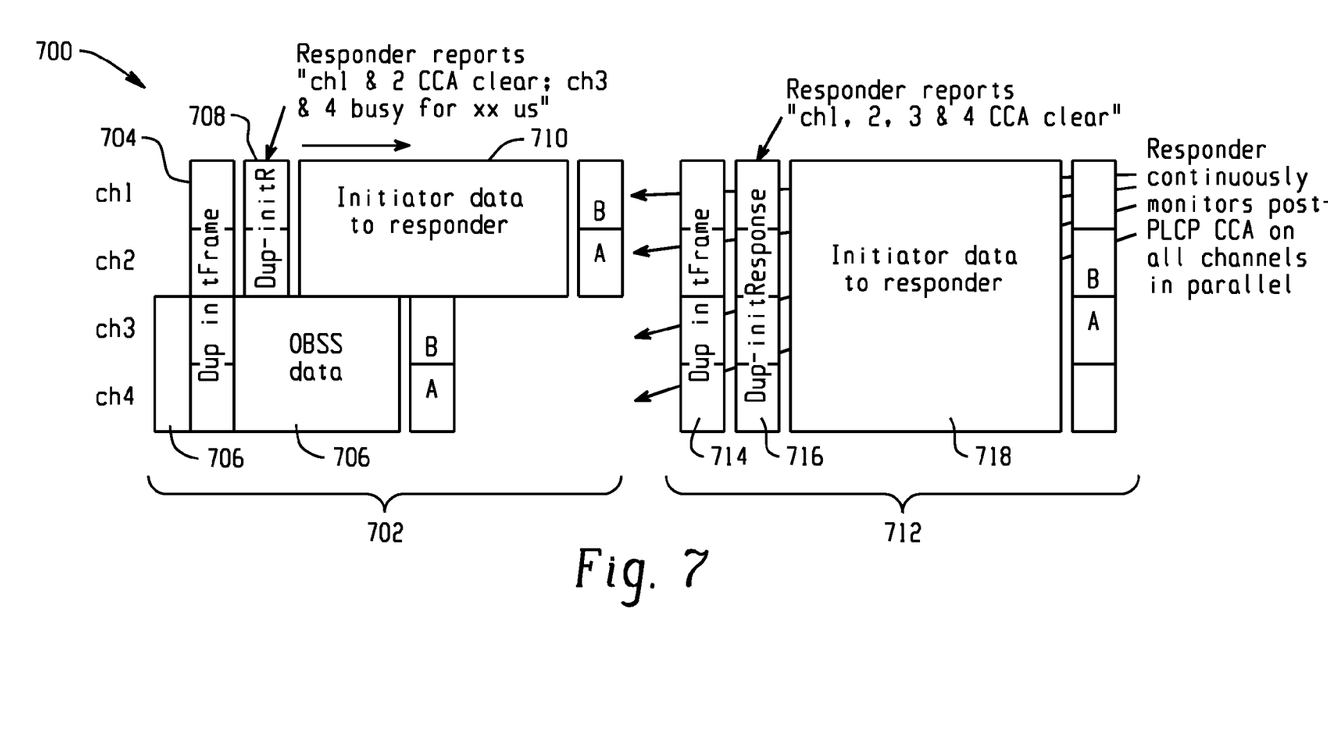
FIG. 7 is an example of a signal diagram for an embodiment that decodes a physical layer header for determining channel availability.

FIG. 7 is an example of a signal diagram 700 for an embodiment that decodes a physical layer header for determining channel availability. In this example, the responder decodes the PHY header of packets detected on channels in parallel ("post-PLCP"). In sequence 702, channels 3 and 4 are unavailable due to data being sent by an Overlapping Basic Service Set ("OBSS"). The initiator sends a frame ("Init-Frame") 704 to initiate communications. In the illustrated example the frame is sent on channels 1-4 and is requesting to establish communications on channels 1-4. The responder receives the InitFrame 704 on channels 1 and 2. The responder may or may not receive Inifframe 704 on channels 3 and 4 due to interference from OBSS data 706. The initiator has already decoded the physical layer ("PHY") header of OBSS data 706. From the PHY header, the responder can determine the amount of time OBSS data 706 will be occupying channels 3 and 4. In an example embodiment, the amount of time is determined from a length field (time) in the PHY header. In another example embodiment, the amount of time is determined from a length field (number of octets) and a modulation and coding scheme (MCS) and data rate fields in the PHY header. The responder then sends a response frame 708 indicating that channel 3 and 4 will be busy for the amount of time determined from the PHY header of the OBSS data 706 updated to account for any elapsed time between RX and TX, etc. The responder receives data 710 from the initiator on channel 1 and 2.

In sequence 712, channel 1-4 are available for communications. The responder sends a request 714 on channel 1-4. The responder determines that channel 1-4 are available. Responder sends response frame 716 on channel 1-4 indicating that channel 1-4 are available (or some encoding or aggregation of this information). The initiator sends data 718 to responder on channel 1-4.

Figure 8:
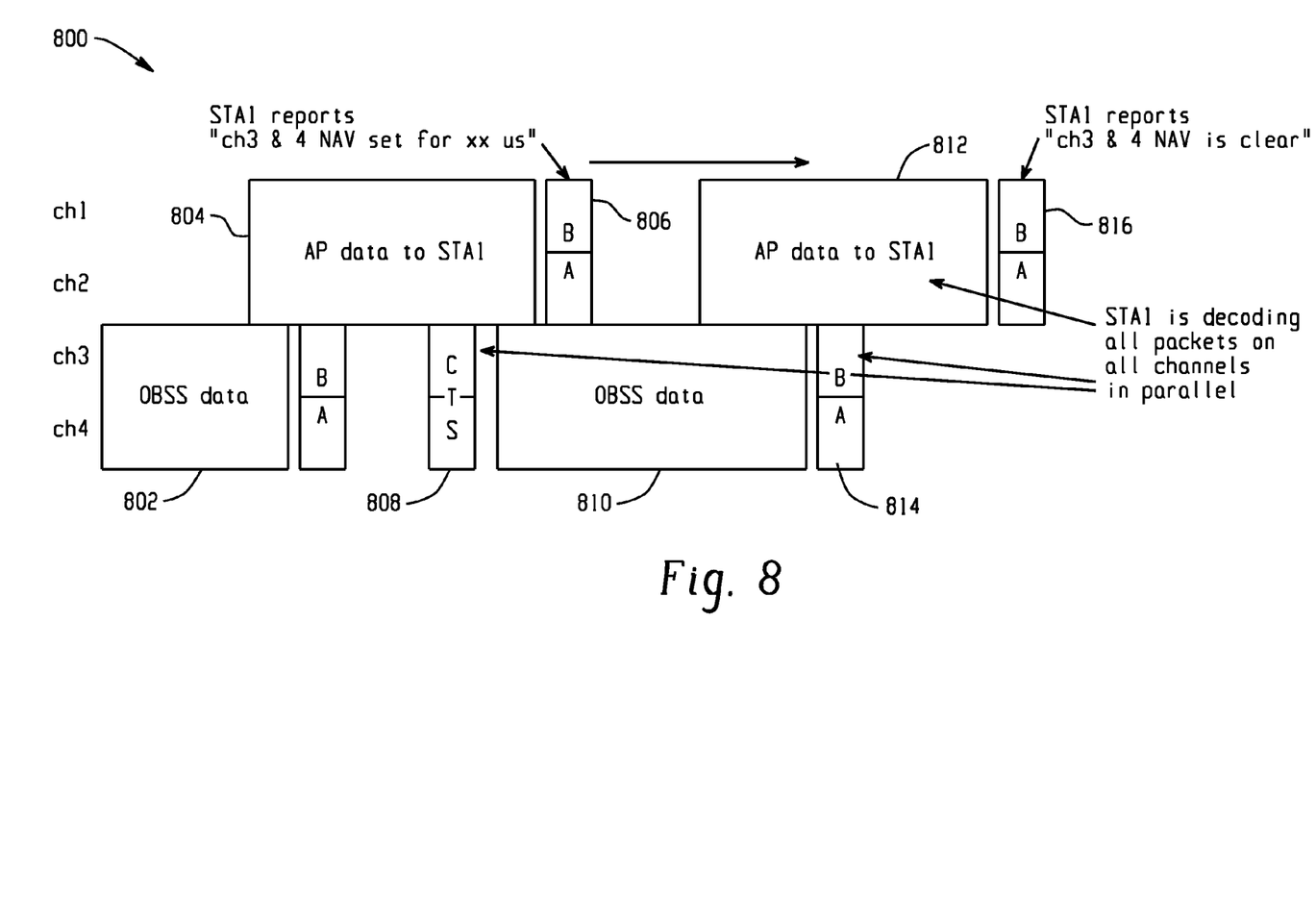
FIG. 8 is an example of a signal diagram for an embodiment that employs network allocation vector echoing for advertising channel availability.

FIG. 8 is an example of a signal diagram 800 for an embodiment that employs network allocation vector ("NAV") echoing for advertising channel availability. In this example, the responder decodes packets in parallel. The responder may decode Request to Send ("RTS"), Clear to Send ("CTS"), Acknowledgement ("ACK"), Block Acknowledgement ("BA"), and/or Contention-Free End ("CF-End") frames and others to obtain a virtual carrier sense ("CS"). From decoding the packets, the responder can determine the NAV state of unavailable channels and forward the NAV state to the initiator updated to account for any elapsed time between RX and TX, etc.

OBSS data 802 is detected on channel 3 and 4 by the responder. The initiator sends data 804 to the responder on channel 1 and 2. When the responder responds to the data, in this example with a block acknowledgement ("BA") 806, the responder includes data of the current NAV state for channel 3 and 4 in BA 806.

In the illustrated example, the responder decodes CTS 808 and determines an amount of time that channel 3 and 4 are being reserved. OBSS data 810 is sent on channel 3 and 4. Concurrently, data 812 is sent from the initiator on channel 1 and 2. Responder decodes BA 814 on channel 3 and 4 and can determine that channel 3 and 4 are now clear. After data 812 is completed, responder responds with BA 816. The responder includes data in BA 816 indicating that the NAV for channel 3 and 4 is clear. The initiator may send data on channel 1-4 after receiving BA 816.

Figure 9:
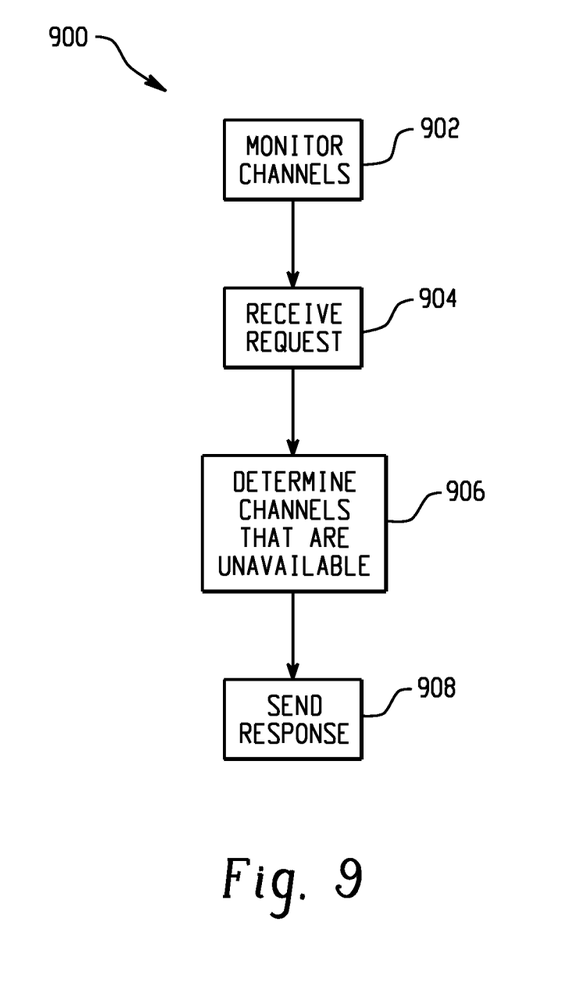
FIG. 9 is an example methodology for providing coexistence on multiple channels.

In view of the foregoing structural and functional features described above, a methodology 900 in accordance with an example embodiment will be better appreciated with reference to FIG. 9. While, for purposes of simplicity of explanation, the methodology of FIG. 9 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect of an example embodiment. The methodology described herein is suitably adapted to be implemented in hardware, software, or a combination thereof such as a processor executing software.

At 902, a plurality of channels are monitored to determine which channels are available and/or unavailable. Any suitable technique may be employed for monitoring the plurality of channels. In an example embodiment, CCA (energy detection) is employed. In another example embodiment described herein, mid-packet detection may be employed, or preamble decoding may also be employed. In another example embodiment described herein, mid-packet CCA detection may be employed to determine if a channel is available or unavailable. In yet another example embodiment, the length field (duration) or length field (#octets) and either MCS or data rate fields of a PHY header may be decoded to determine an amount of time a channel will be unavailable. In still yet another embodiment, frames may be decoded to determine a virtual carrier sense and a NAV for each channel may be obtained.

At 904, a request for establishing communications on a set of channels is received. The set of channels is a subset of the plurality of channels being monitored. The request is received on at least one channel in the set of channels, e.g., on a single agreed channel, the primary channel, but may be received on multiple channels. The request comprises data indicating the set of channels the initiator requesting to employ for communications with the responder.

At 906, the responder determines which of the set of channels are available and/or unavailable for communications. The responder can determine which channels are available and/or unavailable from monitoring the plurality of channels. In embodiments where the PLCP header or the MAC header or other data on unavailable channels is decoded, the responder may also determine how long a channel will be occupied.

At 908, the responder sends a response to the initiator. The response contains data indicating which channels are available and/or unavailable. In particular embodiments, the response may also include data representative of a time period indicating when the unavailable channels are expected to be available. The response is sent on at least one of the available channels.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a plurality of transceivers for sending and receiving data on a plurality of channels;
a plurality of detectors coupled with the plurality of transceivers and having detector outputs; and
a controller coupled with the plurality of detectors, the controller comprising a mid-packet clear channel assessment circuit configured to determine a subset of the plurality of channels that are available for communication;
wherein the plurality of detectors monitor the plurality of channels;
wherein the controller is operable to receive a signal on at least one of the plurality of channels, the signal comprising data representative of a request to establish communications on a set of channels selected from the plurality of channels;
wherein the controller determines from monitoring the plurality of detector outputs which channels from the set of channels are available for establishing communications;
wherein the controller sends a response to the request to establish communications on at least one of the channels available for establishing communications;
wherein the response comprises data representative of which channels from the set of channels and from the subset of channels are available channels for establishing communications;
wherein the response comprises data representative of which channels from the set of channels are unavailable channels for establishing communications; and
wherein the response comprises data representative of a time period when the unavailable channels are expected to be available.

2. The apparatus of claim 1, wherein the controller determines which channels from the set of channels are available for establishing communications from a clear channel assessment of the set of channels.

3. The apparatus of claim 1, the plurality of wireless transceivers further comprise a decoder for decoding a physical layer header; and
wherein the controller determines a time period that an unavailable channel selected from the set of channels is unavailable based on a duration field decoded in the physical layer header.

4. The apparatus of claim 3, wherein the duration field comprises data representative of a data rate and number of octets; and
wherein the controller determines the time period that an unavailable channel is unavailable from the data representative of the data rate and number of octets.

5. The apparatus of claim 3, wherein the duration field comprises a data representative of a modulation and coding scheme and number of octets; and
wherein the controller determines the time period that an unavailable channel is unavailable from the data representative of the modulation and coding scheme, and number of octets.

6. The apparatus of claim 3, wherein the response further comprises data representative of an amount of time that the channel will be busy; and
wherein the controller determines the time period that an unavailable channel is unavailable from data representative of an amount of time that the channel will be busy.

7. The apparatus of claim 1, further comprising a decoder coupled with the detectors for decoding a media access control layer header;
wherein the controller determines a time period that an unavailable channel selected from the set of channels is unavailable based on a duration field decoded in the media access control layer header.

8. The apparatus of claim 7, wherein the response further comprises data representative of the time period that the unavailable channel is unavailable.

9. The apparatus of claim 1, wherein the controller sends the response to the request to establish communications on a plurality of the channels available for establishing communications.

10. A method, comprising:
monitoring a plurality of channels to determine which channels are unavailable for establishing communications;
monitoring for a mid-packet clear channel assessment to determine a subset of channels available for establishing the communication;
receiving a signal comprising data representative of a request to establish communications on a set of the plurality of channels;

determining, by a processor, at least one unavailable channel from the set of channels from monitoring the plurality of channels and from the subset of channels from the mid-packet assessment;

responding to the request to establish communications on the set of the plurality of channels with data representative of the at least one unavailable channel from the set of channels; and responding to the request to establish communications on the set of the plurality of channels with data representative of a time period when the at least one unavailable channel is expected to be available.

11. The method of claim 10, wherein the response is sent on a plurality of available channels.

12. The method of claim 10, further comprising determining for the at least one unavailable channel a time period that the unavailable channel will be unavailable; and wherein responding to the request to establish communications further comprises the time period that the at least one unavailable channel will be unavailable.

13. The method of claim 12, wherein determining for the at least one unavailable channel a time period that the unavailable channel will be unavailable comprises decoding a signal received on the unavailable channel; and determining the time period from data in the decoded signal.

14. Logic encoded in at least one non-transitory computer readable storage medium for execution by a processor, and when executed by a processor operable to:

receive data indicating which channels selected from a plurality of channels are available for establishing communications;

monitor for a mid-packet clear channel assessment to determine a subset of channels available for establishing the communication receive a request to establish communications on a set of channels of the plurality of channels;

determine, which channels of the set of channels and of the subset of channels are available channels for communications; and send a response to the request to establish communications on at least one of the available channels, the response comprising data representative of at least one available channel of the available channels for communication and data representative of at least one unavailable channel, wherein the response comprises data representative of a time period when the at least one unavailable channel is expected to be available.

15. The logic set forth in claim 14, wherein the response is sent on a plurality of available channels.

16. The logic set forth in claim 14, further operable to determine a time period that an unavailable channel of the set of channels will be unavailable.

17. The logic set forth in claim 16, further operable to decode a signal in a received header to determine the time period that the unavailable channel will be unavailable.

18. The logic set forth in claim 16, wherein the response further comprises the time period that the unavailable channel will be unavailable.

* * * * *